US011553328B2

(12) United States Patent
Alonso Alarcon et al.

(10) Patent No.: US 11,553,328 B2
(45) Date of Patent: Jan. 10, 2023

(54) METHODS, DEVICES, AND COMPUTER PROGRAMS FOR PROVISIONING OR CONTROLLING OPERATOR PROFILES IN TERMINALS

(71) Applicant: Telefonaktiebolaget LM Ericsson (publ), Stockholm (SE)

(72) Inventors: Antonio Alonso Alarcon, Madrid (ES); Maria Esther Bas Sanchez, Madrid (ES); Qiang Li, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 164 days.

(21) Appl. No.: 16/971,116

(22) PCT Filed: Mar. 16, 2018

(86) PCT No.: PCT/EP2018/056686
§ 371 (c)(1),
(2) Date: Aug. 19, 2020

(87) PCT Pub. No.: WO2019/161939
PCT Pub. Date: Aug. 29, 2019

(65) Prior Publication Data
US 2021/0092589 A1 Mar. 25, 2021

(30) Foreign Application Priority Data
Feb. 26, 2018 (EP) .................................. 18382112

(51) Int. Cl.
*H04W 8/18* (2009.01)
*H04L 9/40* (2022.01)
(52) U.S. Cl.
CPC ........... *H04W 8/183* (2013.01); *H04L 63/101* (2013.01); *H04L 63/102* (2013.01)

(58) Field of Classification Search
CPC ... H04W 72/048; H04W 12/06; H04W 8/183; H04W 4/70; H04L 63/0428
See application file for complete search history.

(56) References Cited

U.S. PATENT DOCUMENTS 5,471,203 A * 11/1995 Sasaki .................. G06K 7/0008
235/382
8,286,883 B2 * 10/2012 Asnaashari ............. G06F 21/79
235/487

(Continued)

FOREIGN PATENT DOCUMENTS

WO WO-2019161939 A1 * 8/2019 ......... H04L 63/0428

OTHER PUBLICATIONS

Gustavus J. Simmons, "The Smart Card: A Standardized Security Device Dedicated to Public Cryptology," in Contemporary Cryptology: The Science of Information Integrity , IEEE, 1992, pp. 561-613, doi: 10.1109/9780470544327.ch 12. (Year: 1992).*

(Continued)

*Primary Examiner* — William D Cumming
(74) *Attorney, Agent, or Firm* — Christopher & Weisberg, P.A.

(57) ABSTRACT

Methods are disclosed for provisioning and/or controlling operator profiles in terminals, each having an integrated circuit card identified by an integrated circuit card identifier. According to one aspect, a discovery server is configured with an authorization table including associations of integrated circuit card identifier, service provider identifier, and operator identifier(s). The discovery server receives, from a data preparation node, an event registration request that includes a number of elements. The discovery server determines whether the event is authorized. If so, the event is registered. This enables a terminal to seek to retrieve the event, to contact the data preparation node, and to eventually perform the profile operation. Some embodiments enable the (Continued)

network-initiated provisioning and/or controlling of operator profiles in machine-to-machine devices.

10 Claims, 10 Drawing Sheets

(56) References Cited

U.S. PATENT DOCUMENTS

| | | | |
|---|---|---|---|
| 10,939,447 B2 * | 3/2021 | Cheng | H04W 4/70 |
| 11,488,173 B1 * | 11/2022 | Wall | G06Q 30/0637 |
| 2016/0352698 A1 | 12/2016 | Long | |
| 2016/0373920 A1 | 12/2016 | Petersson et al. | |
| 2017/0338944 A1 | 11/2017 | Yang et al. | |
| 2019/0028881 A1 * | 1/2019 | Namiranian | H04W 8/183 |
| 2019/0230645 A1 * | 7/2019 | Cheng | H04W 12/06 |
| 2021/0092589 A1 * | 3/2021 | Alonso Alarcon | H04W 12/06 |

OTHER PUBLICATIONS

Y.-K. Park, S.-H. Lim, O. Yi, S. Lee and S.-H. Kim, "User Authentication Mechanism Using Java Card for Personalized IPTV Services," 2008 International Conference on Convergence and Hybrid Information Technology, 2008, pp. 618-626, doi: 10.1109/ICHIT.2008.275. (Year: 2008).*

I. Broustis, G. S. Sundaram and H. Viswanathan, "Detecting and preventing machine-to-machine hijacking attacks in cellular networks," in Bell Labs Technical Journal, vol. 17, No. 1, pp. 125-140, Jun. 2012, doi: 10.1002/bltj.21527. (Year: 2012).*

International Search Report and Written Opinion dated May 11, 2018 for International Application No. PCT/EP2018/056686 filed on Mar. 16, 2018, consisting of 15-pages.

Embedded SIM Remote Provisioning Architecture Version 1.1; GSM Association; Jan. 30, 2014, consisting of 85-pages.

Remote Provisioning Architecture for Embedded UICC Technical Specification Version 3.2; GSM Association; Jun. 27, 2017, consisting of 309-pages.

RSP Architecture Version 2.2; GSM Association; Sep. 1, 2017, consisting of 95-pages.

RSP Technical Specification Version 2.2; GSM Association; Sep. 1, 2017, consisting of 264-pages.

Embedded SIM Remote Provisioning Architecture Version 1.1; GSM Association; Dec. 17, 2013, consisting of 84-pages.

* cited by examiner

METHODS, DEVICES, AND COMPUTER PROGRAMS FOR PROVISIONING OR CONTROLLING OPERATOR PROFILES IN TERMINALS

CROSS-REFERENCE TO RELATED APPLICATIONS

This application is a Submission Under 35 U.S.C. § 371 for U.S. National Stage Patent Application of International Application No.: PCT/EP2018/056686, filed Mar. 16, 2018 entitled "METHODS, DEVICES, AND COMPUTER PROGRAMS FOR PROVISIONING OR CONTROLLING OPERATOR PROFILES IN TERMINALS," which claims priority to European Application No.: 18382112.3, filed Feb. 26, 2018, the entireties of both of which are incorporated herein by reference.

TECHNICAL FIELD

The present invention relates to methods for provisioning and/or controlling operator profiles in terminals, and to methods for participating in doing so. The invention also relates to devices for carrying out such methods, and to computer programs therefor. Some embodiments of the invention may for example be used in a telecommunication network supporting embedded subscriber identity modules (eSIM) and remote subscriber identity module (SIM) provisioning (RSP).

BACKGROUND

A SIM is an integrated circuit containing information for identifying and authenticating subscribers of terminals, such as mobile phones, to enable them access a mobile communication network. SIM cards are well known and widely used.

In the meantime, the GSM Association (GSMA) has defined an architecture ("Embedded SIM Remote Provisioning Architecture", GSM Association, Official Document SGP.01, Version 1.1, 30 Jan. 2014; hereinafter referred to as "SGP.01", and available at the time of writing from www.gsma.com/newsroom/all-documents/sgp-01-embedded-sim-remote-provisioning-architecture-v1-1/) and related technical specification ("Remote Provisioning Architecture for Embedded UICC Technical Specification", GSM Association, Official Document SGP.02, Version 3.2, 27 Jun. 2017; hereinafter referred to as "SGP.02", and available at the time of writing from www.gsma.com/newsroom/all-documents/sgp-02-v3-2-remote-provisioning-architecture-for-embedded-uicc-technical-specification/) for remote SIM provisioning (RSP) directed to machine-to-machine (M2M) devices. SGP.01 defines a mechanism for "over-the-air" (OTA) remote provisioning of M2M devices with credentials to gain mobile network access (SGP.01, section 1.1). Remotely provisioning M2M devices is desirable, because such devices may not be easily reachable to provision a subscription.

Another GSMA architecture ("RSP Architecture", GSM Association, Official Document SGP.21, Version 2.2, 1 Sep. 2017; hereinafter referred to as "SGP.21", and available at the time of writing from www.gsma.com/newsroom/all-documents/sgp-21-rsp-architecture-v2-2/) and related technical solution ("RSP Technical Specification", GSM Association, Official Document SGP.22, Version 2.2, 1 Sep. 2017; hereinafter referred to as "SGP.22", and available at the time of writing from www.gsma.com/newsroom/all-documents/sgp-22-v2-2-technical-specification/) have been defined for consumer devices, i.e. devices for the consumer market (SGP.21, section 1.1). The architecture is illustrated in SGP.2.2, p. 19, FIG. 1. It enables remote (e.g., OTA) provisioning of eUICC-capable devices with mobile network operator (MNO) profile (e.g. authentication key (Ki), MNO network access configuration etc.) to gain mobile network access.

In that architecture, a so-called "Subscription Manager Data Preparation+" (SM-DP+) is responsible for device MNO profile handling (creation, generation, management, protection, delivery) upon the input/request of MNO. The SM-DP+ is also the off-card entity "responsible for the lifecycle management of the ISD-P [Issuer Security Domain-Profile]" (SGP.21, section 4.10.1). In short, SM-DP+ is the sender of MNO profile in that architecture.

Besides, a so-called "Subscription Manager—Discovery Service" (SM-DS) provides mechanisms that allow an SM-DP+ to inform any eUICC device that an SM-DP+ wishes to communicate (SGP.21, section 4.12.1).

On the device, a Local Profile Assistant (LPA) provides three distinct functions, the Local User Interface (LUI), the Local Profile Download (LPD), and the Local Discovery Service (LDS) (SGP.21, section 4.11.1).

It is desirable to improve the prior art methods notably by providing efficient profile provisioning and control mechanisms that can be performed in a variety of situations and configurations, such as when there is no end user behind a device (e.g. a M2M device).

SUMMARY

To meet or at least partially meet the above-mentioned goals, methods, network nodes, and terminals according to the invention are defined in the independent claims. Particular embodiments are defined in the dependent claims.

In one embodiment, a method is carried out by a network node, hereinafter referred to as "discovery server" (DS), for participating in provisioning and/or controlling operator profiles in terminals, each terminal comprising an integrated circuit card identified by an integrated circuit card identifier. The method comprises the following. The DS is configured with a plurality of associations, hereinafter collectively referred to as "authorization table", wherein each association comprises: (i) an integrated circuit card identifier; (ii) a service provider identifier (SPID) for identifying a service provider (SP) in charge of a terminal comprising an integrated circuit card identified by the integrated circuit card identifier; and, (iii) for each of at least one operator authorized to handle profiles of the integrated circuit card, an operator identifier. The DS receives, from another network node, hereinafter referred to as "data preparation node" or simply "DP node", a request, hereinafter referred to as "event registration request", comprising: (a) an integrated circuit card identifier; (b) a SPID; (c) an operator identifier; and (d) a DP node identifier for identifying the DP node. The DS determines that the received integrated circuit card identifier, the received SPID, and the received operator identifier are associated with one another in the authorization table; and the DS then registers an event record comprising the received integrated circuit card identifier, SPID, and DP node identifier.

This enables the registering of an event record at the discovery server (DS), which a terminal may then retrieve in order to perform a profile operation. This also enables, in particular, the network to initiate the performance of a profile operation at the terminal, without participation of an end user behind the terminal or when there is no end user behind the terminal (e.g. a M2M device).

In one embodiment, the event registration request further comprises an event identifier for identifying the event to be registered; and the event record registered by the DS further comprises the received event identifier.

In another embodiment, registering the event record further comprises: the DS assigning an event identifier for identifying the event record; and the DS sending the event identifier to the DP node.

In one embodiment, after event registration as described above, the DS further receives from a terminal a request for an available event. The request comprises the integrated circuit card identifier and the SPID. The DS then determines that the event record comprises the received integrated circuit card identifier and SPID, and the DS sends, to the terminal, the DP node identifier comprised in the event record. This enables the terminal to query the DP node for information about a profile operation to be performed at the terminal. In an embodiment, the DS may send, to the terminal, the event identifier.

The invention also relates, in one embodiment, to a discovery server (DS) configured to perform any of the above-described methods.

The invention further relates, in one embodiment, to a method carried out by a data preparation (DP) node for participating in provisioning and/or controlling operator profiles in terminals, each terminal comprising, as mentioned above, an integrated circuit card identified by an integrated circuit card identifier. The method comprises the following. The DP node receives a request to perform a profile operation. The request comprises: (I) an integrated circuit card identifier; (II) a SPID; (III) an operator identifier; and (IV) information relating to the profile operation to be performed. The DP node sends, to a discovery server (DS), an event registration request comprising: (a) the received integrated circuit card identifier; (b) the received SPID; (c) the received operator identifier; and (d) a DP node identifier for identifying the DP node; and the DP node associates the integrated circuit card identifier, the SPID, and an indication of the profile operation to be performed, with one another.

In one embodiment, the event registration request further comprises an event identifier for identifying the event to be registered; and associating, by the DP node, the integrated circuit card identifier, the SPID, and the indication of the profile operation to be performed, with one another, further comprises: the DP node associating the event identifier with the integrated circuit card identifier, the SPID, and the indication of the profile operation.

In another embodiment, the method further comprises the DP node receiving, from the DS, an event identifier. In addition, associating, by the DP node, the integrated circuit card identifier, the service provider identifier, and the indication of the profile operation to be performed with one another, further comprises: associating the received event identifier with the integrated circuit card identifier, the service provider identifier, and the indication of the profile operation.

In one embodiment, after having sent an event registration request to the DS, the DP node receives, from a terminal, a request for a profile operation comprising the above-mentioned event identifier. The DP node then determines that the event identifier is associated with the indication of the profile operation to be performed; and the DP node sends, to the terminal, the indication of the profile operation to be performed determined to be associated with the event identifier. This enables the terminal to receive information about a profile operation to be performed.

In another embodiment, after having sent an event registration request to the DS, the DP node receives, from a terminal, a request for a profile operation comprising the integrated circuit card identifier and the SPID. The DP node then determines that the integrated circuit card identifier and the SPID are associated with the indication of the profile operation to be performed; and the DP node sends, to the terminal, the indication of the profile operation to be performed determined to be associated with the integrated circuit card identifier and the SPID. This also enables the terminal to receive information about a profile operation to be performed.

The invention also relates, in one embodiment, to a data preparation (DP) node configured to perform any of the above-described methods.

The invention further relates, in one embodiment, to a method carried out by a terminal for allowing provisioning and/or controlling operator profiles in the terminal, the terminal comprising, as mentioned above, an integrated circuit card identified by an integrated circuit card identifier. The method comprises the following. The terminal sends, to a discovery server (DS), a request for an available event, wherein the request comprises the integrated circuit card identifier for identifying the integrated circuit card comprised in the terminal, and a SPID for identifying a service provider in charge of the terminal. The terminal then receives, from the DS, a DP node identifier for identifying a DP node. The terminal then sends, to the DP node identified by the DP node identifier, a request for a profile operation. The terminal eventually receives, from the DP node, an indication of a profile operation to be performed; and it performs the indicated profile operation.

The invention also relates, in one embodiment, to a terminal configured to perform the above-described method.

The invention further relates, in one embodiment, to a method performed by at least two of, or by all of, a discovery server (DS), a data preparation (DP) node, and a terminal, according to any of the above-described embodiments.

The invention also relates to a system comprising two of, or all of, a DS, a DP node, and a terminal, as described above.

The invention also relates to computer programs, computer program products and storage mediums comprising computer-readable instructions configured, when executed on network nodes and/or terminals, to cause the network nodes and/or terminals to carry out a method according to any one of the above-described embodiments, or to implement the functions of a network node or terminal according to any one of the above-described embodiments.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims. A list of abbreviations and their meaning is provided at the end of the detailed description.

Figure 1:
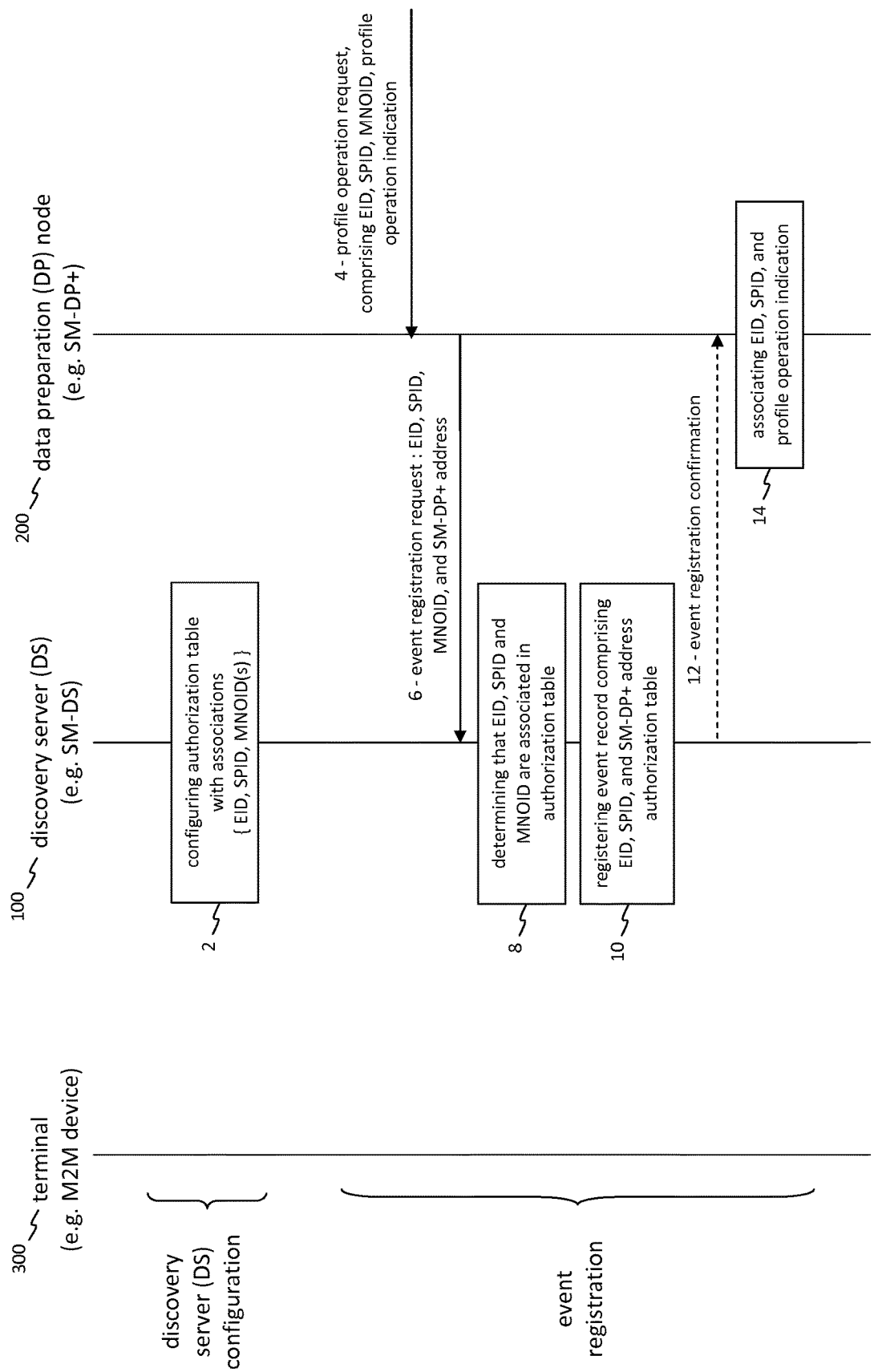
FIG. 1 is a message sequence chart of a method in one embodiment of the invention.

FIG. 1 is a message sequence chart of a method in one embodiment of the invention. The method is carried out by two network nodes, namely a discovery server (DS) 100 and a data preparation (DP) node 200. DS 100 may for example be similar to, or may be built upon, a SM-DS according to SGP.01, although the invention is not limited thereto. Likewise, DP node 200 may for example be similar to, or may be built upon, a SM-DP+ according to SGP.01, although the invention is not limited thereto.

The method aims at preparing the provisioning and/or controlling of operator profiles in terminals 300, wherein each terminal 300 comprises an integrated circuit card 301 identified by an integrated circuit card identifier. In one embodiment, provisioning an operator profile in a terminal 300 involves providing credentials to be stored in the terminal's 300 integrated circuit card 301 so that the terminal 300 may communicate over the mobile communication network controlled by the operator. In one embodiment, controlling (also called "managing") an operator profile in a terminal 300 involves changing the status or parameters of, or deleting, an operator profile stored in the terminal's 300 integrated circuit card 301. In one embodiment, a profile comprises data and applications to be provisioned onto, or present on, a terminal's 300 integrated circuit card 301, for the purpose of providing services to the terminal 300, such as providing mobile communication access to the terminal 300.

Terminal 300 may be any type of communication terminal (or user equipment (UE)) such as, for example, a machine-to-machine (M2M) device (e.g., a M2M device included in a utility meter, a sensor, an actuator, a car, or a camera), a mobile phone, a smartphone, a laptop, a desktop computer, a tablet PC, a watch phone, a gaming device, an e-book reader, a fixed telephone, an IoT device, etc. In one embodiment, terminal 300 is self-operable and does not require a human operating the device for communicating with a telecommunications system. In one embodiment, terminal 300 is a piece of equipment into which an eUICC and a communication module are inserted during assembly. By "eUICC", i.e. embedded UICC, it is meant here "[a] UICC which is not easily accessible or replaceable, is not intended to be removed or replaced in the terminal, and enables the secure changing of Subscriptions" (SGP.01, section 1.5). An eUICC is also referred to in the art as an embedded SIM (eSIM). In that respect, DP node 200 may be regarded as a profile manager to initiate profile provisioning and/or management in the eUICC of a terminal 300, whereas DS 100 is used to trigger the terminal 300 to connect to DP node 200 so that the profile operation can be pushed to the terminal 300. At the same time, DS 100 is also used to enforce authorization within the procedure.

The method illustrated in FIG. 1 comprises the following steps.

In step 2, DS 100 is configured with a plurality of associations, here collectively referred to as "authorization table". In one embodiment, the authorization table is stored in DS 100. In another embodiment, the authorization table is accessible to DS 100, although not stored therein. Each association comprises: (i) an integrated circuit card identifier; (ii) a service provider identifier (SPID) for identifying a service provider (SP) in charge of a terminal comprising an integrated circuit card identified by the integrated circuit card identifier; and, (iii) one or more operator identifiers for identifying operators authorized to handle profiles for the integrated circuit card, i.e., for each of at least one operator authorized to handle profiles of the integrated circuit card, an operator identifier.

In one embodiment, terminal 300 comprises an eUICC, and the integrated circuit card identifier is an eUICC identifier (EID), as exemplarily illustrated in FIG. 1. That is, a terminal 300 may be identified by the integrated circuit card identifier of the integrated circuit card 301 comprised in (e.g., embedded in) the terminal 300.

In one embodiment, a SP is an entity providing "services to its service Subscribers on a contractual basis and who is responsible for the services offered" (SGP.01, section 1.5). In that sense, the SP is in charge of terminal 300. In one embodiment, for example if terminal 300 is a M2M device, or more generally a self-operable device that does not require a human operating the device for communicating with a telecommunications system, the SP in charge of the terminal 300 is responsible for operating it. For example, the M2M device may be a utility meter, and the SP may be the utility or a meter operator. More specifically, if the M2M device is an electricity meter, the SP may be the electricity utility or a meter operator. In one embodiment, the SP is an original equipment manufacturer (OEM) or a car manufacturer.

In one embodiment, an operator is a mobile network operator (MNO), i.e. "[a]n entity providing access capability and communication services to its Customers [or Subscribers] through a mobile network infrastructure" (SGP.01, section 1.5; SGP.21, section 1.4). In that embodiment, the operator identifier is a mobile network operator identifier (MNOID), as exemplarily illustrated in FIG. 1.

Prior to being configured with the authorization table, DS 100 may obtain or receive information making up the authorization table. For example, the DS configuration may be initiated by a network node controlled by the SP in charge of terminal 300, as described below with reference to FIG. 3. The SP may also delegate such configuration process to an operator-controlled node (e.g., a MNO node) or DP node 200. If delegated to an operator-controlled node, the configuration process may be further delegated to DP node 200, as will be described below with reference to FIG. 3.

Referring again to FIG. 1, in step 4 (which may be performed prior to, in parallel with, or after step 2), DP node 200 receives a request to perform a profile operation. The request, referred to as "profile operation request" in FIG. 1, comprises: (I) an integrated circuit card identifier, which may for example be an eUICC identifier (EID), as illustrated in FIG. 1 and as already discussed above; (II) a SPID; (III) an operator identifier, which may for example be a MNOID, as illustrated in FIG. 1 and as already discussed above; and (IV) information relating to the profile operation to be performed, i.e. metadata associated to the operation to be performed. The information relating to the profile operation to be performed may include information identifying an operation to be performed in relation to a profile, such as for example downloading a profile on a terminal's 300 integrated circuit card 301, enabling or disabling a profile stored on a terminal's 300 integrated circuit card 301, modifying the parameters of a profile stored on a terminal's 300 integrated circuit card 301, and/or deleting a profile stored on a terminal's 300 integrated circuit card 301.

In one embodiment, DP node 200 receives the request to perform a profile operation from a network node controlled by an operator (e.g. a MNO), as will be described below with reference to FIG. 5. In another embodiment, DP node 200 receives the request to perform a profile operation from a network node controlled by a SP. The provisioning or management of a profile on terminal 300 may therefore be remotely initiated, i.e. triggered, by the network. The provisioning or management of a profile on terminal 300 may be initiated without participation and interaction of the end user behind the terminal and may be initiated even when there is no end user behind the terminal. This is advantageous for profile provisioning and/or management on M2M devices, behind which no end user is typically standing.

In step 6 (which may be performed in parallel with, or after, step 2), DP node 200 sends, to DS 100, an event registration request comprising: (a) the received integrated circuit card identifier, which may for example be an eUICC identifier (EID) as illustrated in FIG. 1; (b) the received SPID; (c) the received operator identifier, which may for example be a MNOID as illustrated in FIG. 1; and (d) a DP node identifier for identifying DP node 200. DS 100 then receives the event registration request from DP node 200. Optionally, the event registration request may further comprise information relating to the profile operation to be performed.

In step 8, DS 100 determines whether the received integrated circuit card identifier, the received SPID, and the received operator identifier are associated with one another in the authorization table. In other words, DS 100 determines whether the received SPID and the received operator identifier are configured for the received integrated circuit card identifier (which may for example be an EID, as mentioned above).

If so, the combination of integrated circuit card identifier, SPID, and operator identifier is authorized in the authorization table, and DS 100 registers, in step 10, an event record comprising the received integrated circuit card identifier, SPID, and DP node identifier. In other words, DS 100 registers an event record for the integrated circuit card identifier. The event record may optionally comprise information relating to the profile operation to be performed.

Otherwise (i.e., if DS 100 determines that the received integrated circuit card identifier, SPID, and operator identifier are not associated with one another in the authorization table), the combination of integrated circuit card identifier, SPID, and operator identifier is not authorized in the authorization table. In such a case, DS 100 refrains from registering any event record as a result of receiving the event registration request (not illustrated in FIG. 1).

Optionally, in step 12, DS 100 may send an event registration confirmation to DP node 200 to indicate that the event has been registered (the dashed arrow in FIG. 1 meaning that the step is optional). Conversely, if the event has not been registered, DS 100 may also indicate so to DP node 200 (not illustrated in FIG. 1).

In step 14, DP node 200 associates the integrated circuit card identifier, the SPID, and an indication of the profile operation to be performed, with one another, for example by storing the association in memory. In one embodiment, DP node 200 also associates the operator identifier received in step 4 with the three above-mentioned elements. In one embodiment, step 14 is performed after receiving an event registration confirmation (as illustrated in FIG. 1). In another embodiment, step 14 is performed immediately upon receiving the profile operation request, i.e. immediately after step 4 or step 6, but the provisionally stored association may later be deleted if it turns out that the event record is not authorized and cannot been registered at DS 100 (not illustrated in FIG. 1).

The profile operation request, the event registration request, and the optional event registration confirmation may each be transmitted by means of a respective message, i.e. a set of bits forming a packet which can be transmitted over a communication network. They may also each be transmitted through a series of packets. They may for example each be transmitted in an IP packet. Furthermore, they may be transmitted through one or more intermediate network nodes (not illustrated in FIG. 1), such as for example nodes of a cellular access network or packet core network in a mobile or fixed communication network. The same applies to other requests and the like, as described later throughout the description.

In one embodiment (not illustrated in FIG. 1), the event registration request transmitted in step 6 from DP node 200 to DS 100 further comprises an event identifier for identifying the event to be registered. The event record registered in step 10 by DS 100 then further comprises, in addition to the received integrated circuit card identifier, SPID, and DP node identifier, the received event identifier. Further, DP node 200 not only associates in step 14 the integrated circuit card identifier, the SPID, and the indication of the profile operation to be performed, with one another, but also associates the event identifier therewith. That is, the event identifier may be created by DP node 200 and sent to DS 100.

In one embodiment (not illustrated in FIG. 1), upon registering the event record in step 10, DS 100 also assigns an event identifier for identifying the event record. DS 100 then transmits in step 12 to DP node 200 the event identifier identifying the registered event record. DP node 200 then associates in step 14 not only the integrated circuit card identifier, the SPID, and the indication of the profile operation to be performed, with one another, but also associates the event identifier therewith. That is, the event identifier may be created by DS 100 and sent to DP node 200, and the event registration request transmitted in step 6 need not comprise an event identifier. In one embodiment, DP node 200 further associates the operator identifier received in step 6 with the four above-mentioned elements.

In one embodiment (not illustrated in FIG. 1), one or more authorized profile operation(s) may further be configured in the authorization table. That is, at least one of the associations forming the authorization table, configured in step 2 as described above, further comprises, for at least one operator identifier, indication of at least one authorized profile operation. The event registration request then further comprises an indication of a profile operation to be performed. In step 8, DS 100 then determines whether the received integrated circuit card identifier, the received SPID, the received operator identifier, and the profile operation for which an indication has been received, are associated with one another in the authorization table. In other words, DS 100 determines that the profile operation for which an indication has been received is authorized according to the authorization table. The authorized profile operation(s) may for example comprises a profile download, a profile enable, a profile disable, a profile delete, or a combination thereof, such as for example a combination of a profile download and profile enable.

In one embodiment (not illustrated in FIG. 1), the event registration request, transmitted in step 6, is received by DS 100 together with information to enable the configuration of the authorization table on DS 100 (as described above with reference to step 2). That is, the DS configuration and event registration may be performed simultaneously or substantially simultaneously.

Figure 2:
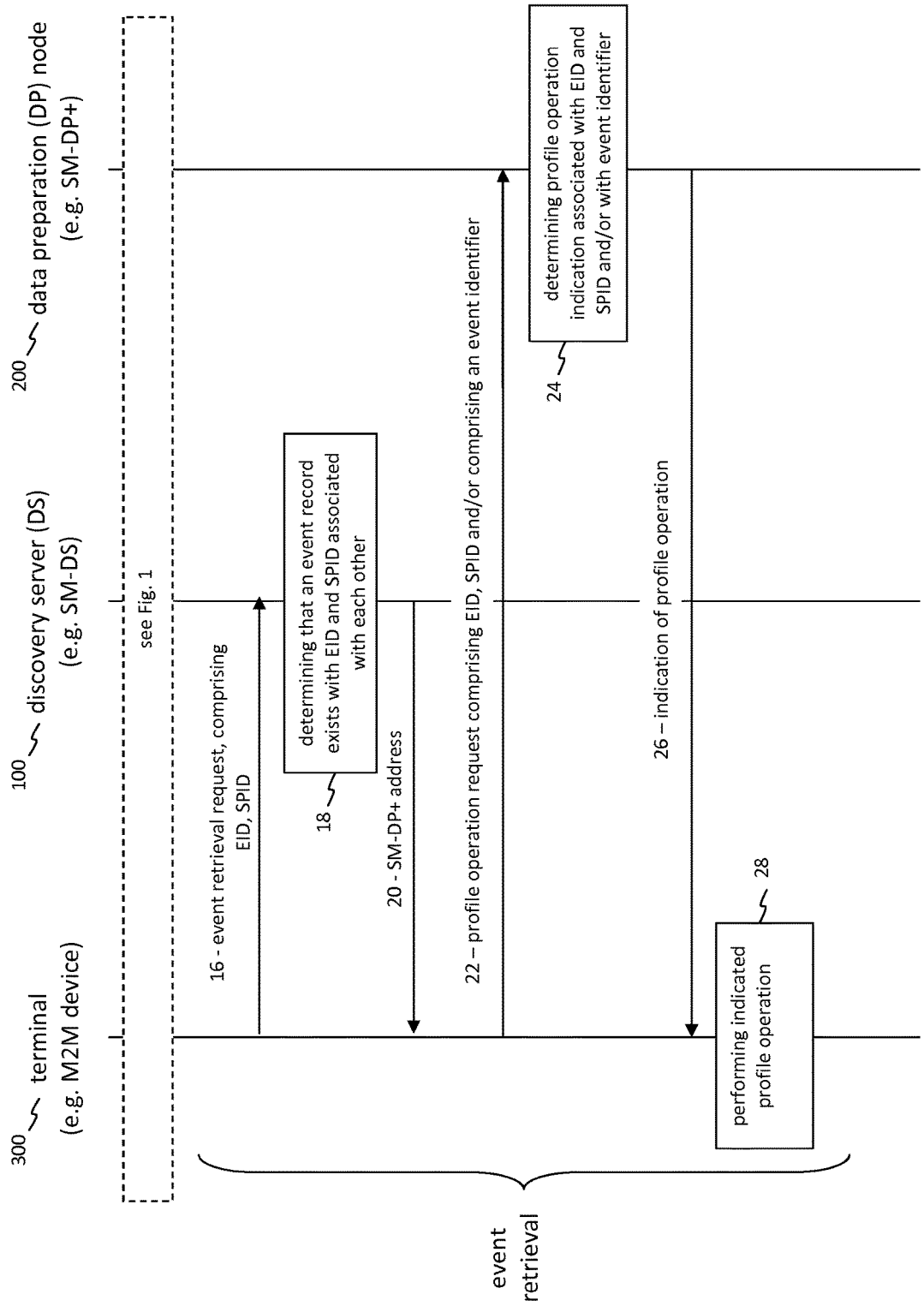
FIG. 2 is a message sequence chart of a method in one embodiment of the invention, including a discovery server (DS) configuration process and an event registration process (both illustrated in FIG. 1), as well as an event retrieval process.

FIG. 2 is a message sequence chart of a method in one embodiment of the invention, including a DS configuration process and an event registration process (both already illustrated in, and described with reference to, FIG. 1), as well as an event retrieval process. That is, the method of FIG. 2 comprises steps 2 to 14 already described above with reference to FIG. 1 as well as the following steps carried out thereafter.

In step 16, terminal 300 transmits, to DS 100, an event retrieval request, i.e. a request for an available event. As discussed above, terminal 300 comprises an integrated circuit card 301 identified by an integrated circuit card identifier. The event retrieval request comprises the integrated circuit card identifier of the integrated circuit card comprised in terminal 300, and a SPID for identifying a service provider in charge of terminal 300. The integrated circuit card identifier may for example be an eUICC identifier (EID), as illustrated in FIG. 2. DS 100 receives the event retrieval request. In one embodiment, terminal 300 periodically transmits event retrieval requests to DS 100. Terminal 300 may also transmit an event retrieval request to DS 100 when switched on or at other occasions.

In step 18, DS 100 determines whether it has a registered event record comprising the received integrated circuit card identifier, which may be an EID as mentioned above, and the received SPID. If so, in step 20, DS 100 transmits, to terminal 300, the DP node identifier comprised in the identified event record. In one embodiment, DS 100 also transmits, to terminal 300, an event identifier for identifying the event record. If DS 100 has no registered event record comprising the received integrated circuit card identifier and the received SPID, the event retrieval process may end at that stage (not illustrated in FIG. 2).

In step 22, terminal 300 then transmits, to the DP node 200 identified by the DP node identifier, a profile operation request, i.e. request for a profile operation. In one embodiment, the profile operation request comprises the terminal's 300 integrated circuit card identifier and the SPID. In another embodiment, the profile operation request comprises the event identifier that terminal 300 may have received from DS 100. In one embodiment, the profile operation request comprises the terminal's 300 integrated circuit card identifier, the SPID, and the event identifier.

In step 24, DP node 200 identifies, based on the information it receives from terminal 300, the profile operation to be performed at terminal 300. In one embodiment, the profile operation request comprises the terminal's 300 integrated circuit card identifier and the SPID, and DP node 200 then determines that the integrated circuit card identifier and the SPID are associated with an indication of the profile operation to be performed, which DP node 200 then transmits, in step 26, to terminal 300. In another embodiment, the profile operation request comprises an event identifier, and DP node 200 then determines the event identifier is associated with the indication of the profile operation to be performed, which DP node 200 then transmits, in step 26, to terminal 300. Terminal 300 then performs, in step 28, the indicated profile operation.

Figure 3:
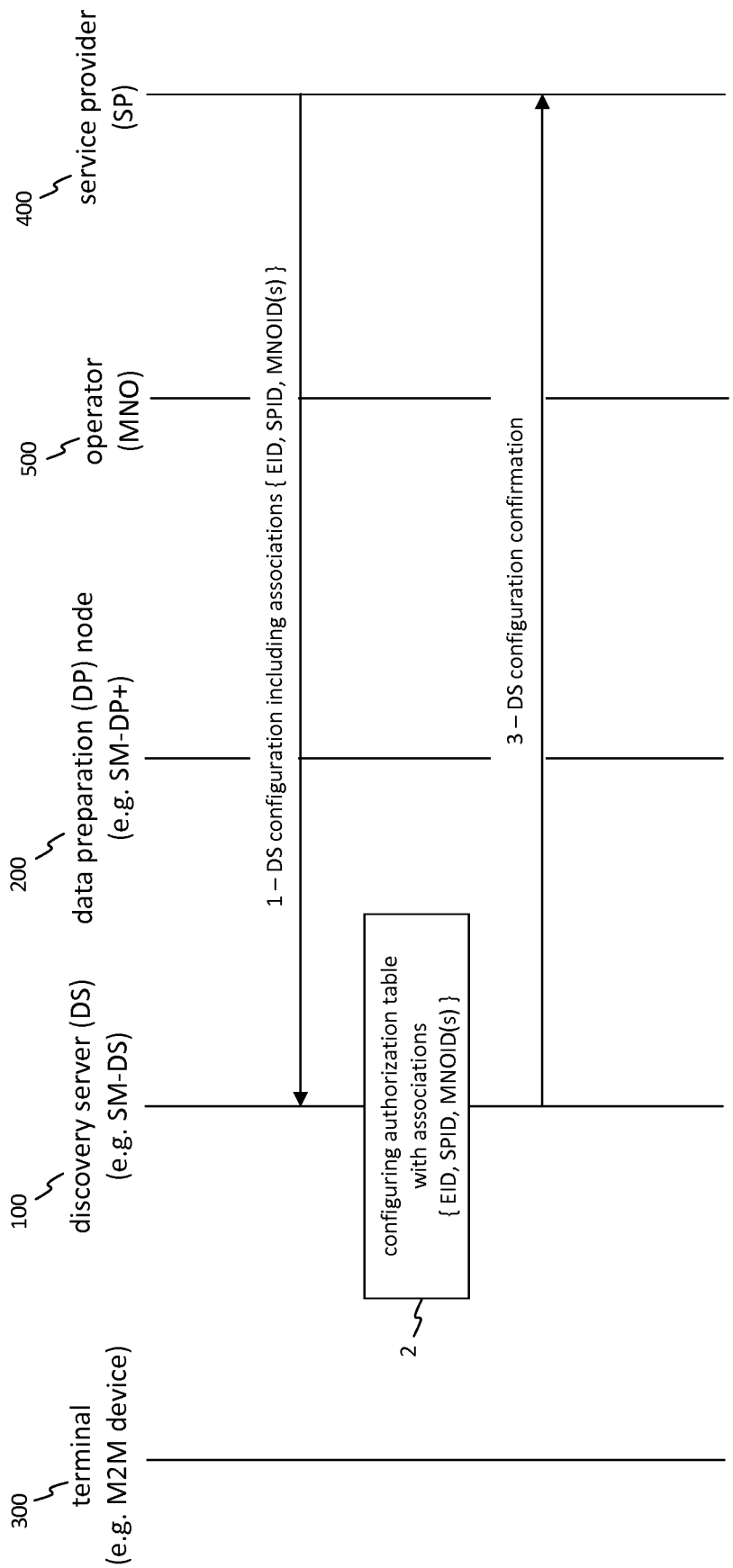
FIG. 3 is a message sequence chart of a portion of a method in one embodiment of the invention, the portion relating to a DS configuration process.

FIG. 3 is a message sequence chart of a portion of a method in one embodiment of the invention, the portion relating to a DS configuration process.

Service provider (SP) 400 is in charge of terminal 300 having a given integrated circuit card identifier, hereinafter referred to as eUICC identifier (EID) (although the invention is not limited thereto). In step 1, SP 400 triggers the configuration of a DS 100 with its own identifier (SPID), with an EID, and with one or more identifiers of mobile network operator (MNO) nodes 500 authorized to handle profiles for the eUICC. As a result, in step 2, an authorization table is configured in DS 100. Table 1 shows such an exemplary authorization table.

TABLE 1

Exemplary authorization table configured in discovery server (DS)

| eUICC | SP | Authorized profile provisioning/ management operations with allowed MNOs |
|---|---|---|
| $EID_1$ | $SPID_1$ | $MNO_A$, $MNO_B$, $MNO_C$ |
| $EID_2$, $EID_3$ | $SPID_1$ | $MNO_A$, $MNO_B$ |
| ... | ... | ... |

According to Table 1, SP 400 with $SPID_1$ has authorized MNOs to perform any profile operations on $MNO_A$, $MNO_B$ and $MNO_C$ profiles, when it comes to integrated circuit card with identifier $EID_1$. Furthermore, SP 400 with $SPID_1$ has authorized MNOs to perform any profile operations on $MNO_A$ and $MNO_B$ profiles, when it comes to integrated circuit cards with identifiers $EID_2$ and $EID_3$.

In step 3, DS 100 may then confirm to SP 400 that the authorization table has been successfully configured, i.e. created or updated.

In one embodiment, the authorization table may also contain authorizations at the operation level. That is, DS 100 may be configured with one or more profile operations authorized to be performed by each MNO node 500. DS 100 stores this information in an authorization table. Table 2 shows such an exemplary authorization table.

TABLE 2

Exemplary authorization table configured in discovery server (DS) with authorized operations

| eUICC | SP | | Authorized profile provisioning/ management operations with allowed MNOs |
|---|---|---|---|
| $EID_1$ | $SPID_1$ | Profile download | $MNO_B$, $MNO_C$ |
| | | Profile enable/disable | $MNO_A$, $MNO_B$, $MNO_C$ |
| | | Profile delete | $MNO_C$ |

TABLE 2-continued

Exemplary authorization table configured in discovery server (DS) with authorized operations

| eUICC | SP | Authorized profile provisioning/ management operations | with allowed MNOs |
|---|---|---|---|
| $EID_2$, $EID_3$ | $SPID_1$ | Profile download Profile enable/disable Profile delete | $MNO_C$ $MNO_B$, $MNO_C$ $MNO_C$ |
| ... | ... | ... | |

According to Table 2, SP 400 with $SPID_1$ has authorized MNOs to perform profile download operations on $MNO_B$ and $MNO_C$ profiles, profile enable/disable operations on $MNO_A$, $MNO_B$, and $MNO_C$ profiles, and profile delete operations on $MNO_C$ profiles, when it comes to integrated circuit card with identifier $EID_1$. Further, SP 400 with $SPID_1$ has authorized MNOs to perform profile download operations on $MNO_C$ profiles, profile enable/disable operations on $MNO_B$, and $MNO_C$ profiles, and profile delete operations on $MNO_C$ profiles, when it comes to integrated circuit cards with identifiers $EID_2$ and $EID_3$.

Figure 4:
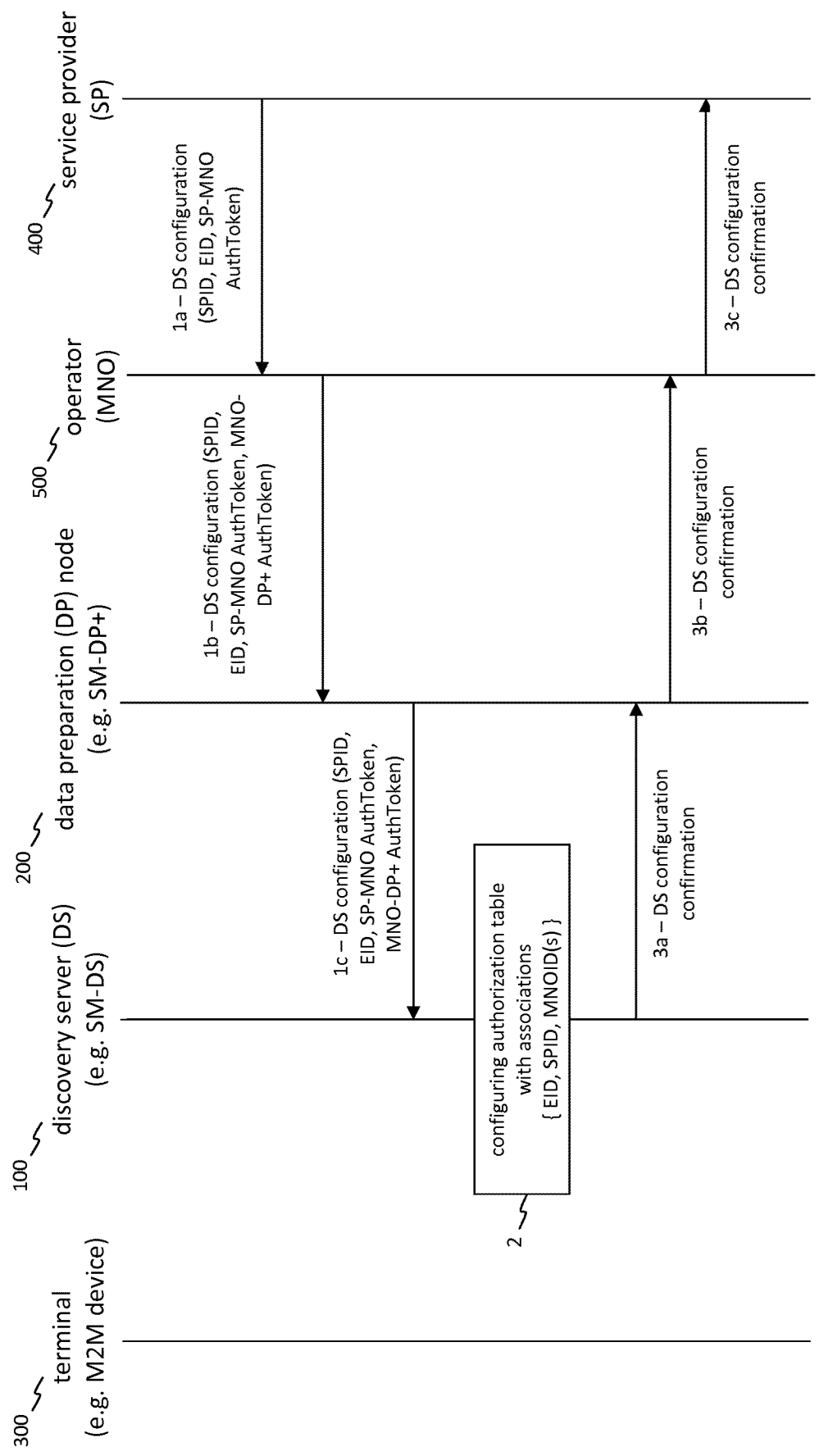
FIG. 4 is a message sequence chart of a portion of a method in one embodiment of the invention, the portion relating to a DS configuration process with transmission of authorization tokens.

FIG. 4 is a message sequence chart of a portion of a method in one embodiment of the invention, the portion relating to a DS configuration process with transmission of authorization tokens. That is, DS configuration delegation may be done by transmitting authorization tokens from SP 400 towards DP node 200, and using further authorization tokens when delegation is done through an MNO 500.

In particular, SP 400 sends a DS configuration request towards DS 100, with a SPID of a service provider (SP) node in charge of a terminal 300 (e.g., an M2M device) with an eUICC identifier (EID), and one or more identifiers of respective MNOs authorized to handle profiles for the eUICC, and, optionally, one or more profile operations authorized to be performed by each MNO node.

The SP 400 in charge of a terminal 300 does the DS configuration, but SP 400 may delegate the implementation of such a configuration to a MNO 500 or to a DP node 200. If delegated to a MNO 500, MNO 500 may further delegate the implementation to an DP node 200.

This delegation process may be implemented by transmitting authorization tokens from SP 400 towards DP node 200, and using further authorization tokens when delegation is done through an MNO 500, as follows:

(1) Transmitting, from SP node 400 towards DP node 200, in charge of a terminal 300 with an integrated circuit card identifier EID, a message indicating an authorization for network-initiated profile provisioning and/or management with an authorization token, wherein the authorization token comprises an identifier of an authorizing entity and an identifier of an authorized entity to perform indicated profile provisioning and/or management operations with indicated MNOs for the EID;

(2) Receiving, at the DP node 200, the message originating from the SP node 400 together with a further authorization token, wherein the further authorization token comprises an identifier of a further authorizing entity and an identifier of a further authorized entity to perform the indicated profile provisioning and/or management operations with the indicated MNOs for the EID;

(3) Triggering, from the DP node 200 to the DS node 100, storage of the authorization token and the further authorization token for the EID.

In more detail, an implementation of the delegation process may be performed as follows:

Steps 1a, 1b, and 1c (see FIG. 4):

The SP 400 which is in charge of a terminal 300 with certain EID sends a DS configuration request towards the DS 100 through MNO 500 and/or DP node (e.g. SM-DP+) 200, including the SPID, EID and an SP authorization token:

SP-MNO AuthToken=[SP/D authorizes MNOID to perform "Allowed Profile Provisioning/Management Operations with Allowed MNOs" for BD]$_{signed\ by\ SPID}$ MNO 500 may delegate such authorization to DP node (e.g. SM-DP+) 200. Thus, the authorization chain may be as follows:

MNO-DP+AuthToken=[MNO/D authorizes DP+ID to perform "Allowed Profile Provisioning/Management Operations with Allowed MNOs" for EID]$_{signed\ by\ MNOID}$ SP 400 may also directly authorize DP node (e.g. SM-DP+) 200:

SP-DP+AuthToken=[SPID authorizes DP+ID to perform "Allowed Profile Provisioning/Management Operations with Allowed MNOs" for EID]$_{signed\ by\ SPID}$ Authorization tokens may be generated for network profile provisioning and/or management in general, or may be generated per profile operation (e.g. enabling, disabling, download . . . ).

Authorization token may be generated for profile provisioning and/or management of certain EID (as tokens above), or in general for all devices for which the SP is in charge.

Step 2 (see FIG. 4):

DS node 100 then builds the configuration, e.g. authorization table (see examples in above Tables 1 and 2).

This embodiment enables an authorization framework to be established. That is, different entities with the access rights have control on the profiles being used by the terminals 300 (such as M2M devices), i.e. the SP 400 or the MNO 500.

Figure 5:
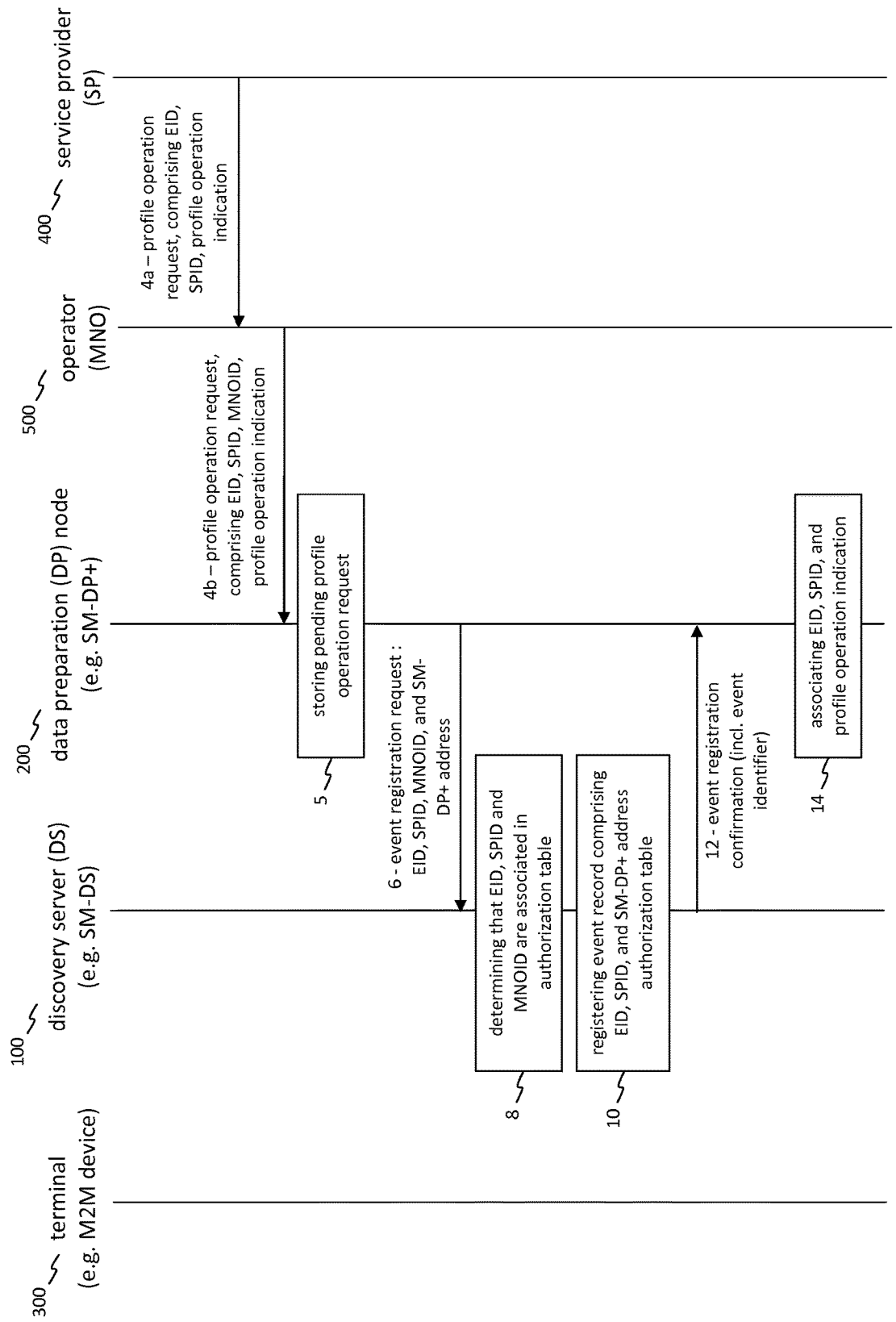
FIG. 5 is a message sequence chart of a portion of a method in one embodiment of the invention, the portion relating to an event registration process.

FIG. 5 is a message sequence chart of a portion of a method in one embodiment of the invention, the portion relating to an event registration process. When a DP node 200 receives a profile operation request, it starts the procedure by registering the event in the DS 100. An exemplary implementation of the registration process may be as follows:

Steps 4a, 4b: The SP 400, which is in charge of the device with certain EID, requires the performance of a profile operation, and sends the request (e.g. enable/disable, prepare/delete profile) to the MNO 500 handling the EID. MNO 500 sends the request to a DP node (e.g. SM-DP+) 200.

Optionally, the operation may be initiated directly by MNO 500 or DP node (e.g. SM-DP+) 200 if the SP 400 has previously delegated the subscription management of the EID to them. In this case, DS 100 should be configured accordingly.

Step 5: DP node (e.g. SM-DP+) 200 creates a record (EID, profile operation (e.g., enable/disable . . . ), SPID) to store the pending request.

Step 6: DP node (e.g. SM-DP+) 200 registers an event for the EID in the DS 100, adding the MNOID if needed, and, optionally, the profile operation.

Steps 8 and 10: DS 100 authorizes or not the registration based on the data stored in the authorization table. If positive, DS 100 creates, i.e. registers, an event record with following information: EID, DP node (e.g. SM-DP+) address, and SPID.

Step 12: DS 100 returns the registered event identifier, if DS 100 created the event identifier.

Step 14: DP node (e.g. SM-DP+) 200 adds the event identifier in its own record.

Figure 6:
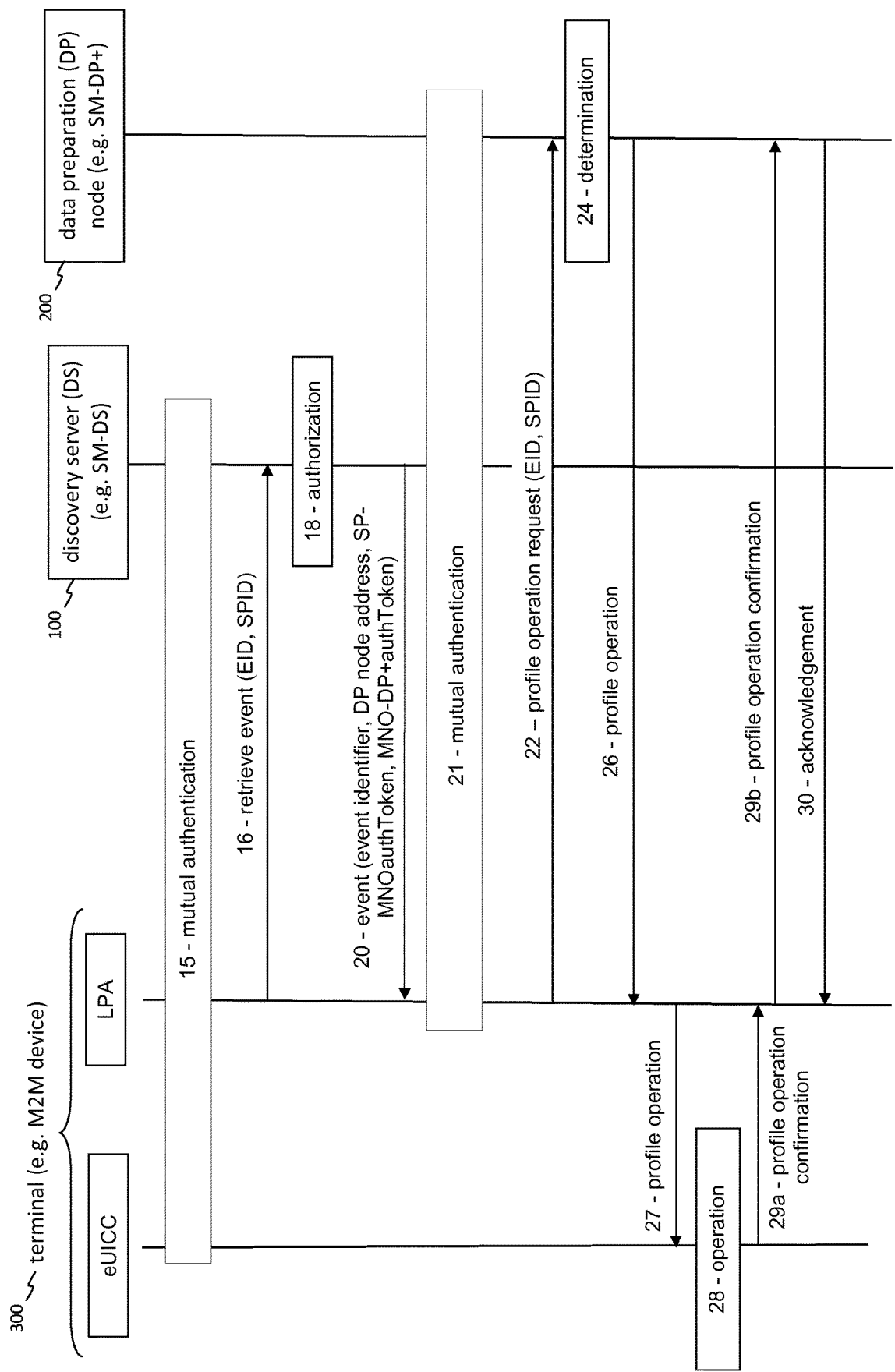
FIG. 6 is a message sequence chart of a portion of a method in one embodiment of the invention, the portion relating to an event retrieval process.

FIG. 6 is a message sequence chart of a portion of a method in one embodiment of the invention, the portion relating to an event retrieval. An exemplary implementation of the event retrieval may be as follows:

Step 15: Terminal 300 accesses SM-DS 100 and mutual authentication is performed, as known in the art.

Step 16: Terminal 300 sends an event retrieval request, i.e. a request for an available event to DS 100. The event retrieval request includes the SPID of the SP in charge of terminal 300. The SPID is configured in LPA by SP 400 (e.g., OEM) either during device manufacturing phase or later. This SPID may be signed by SP 400, so that it is not possible, or at least very difficult, to change it.

Step 18: DS 100 authorizes the operation based on the SPID received from terminal 300 and the authorization table.

Step 20: DS 100 then returns the event identifier and the DP node (e.g., SM-DP+) address to the terminal's 300 LPA. Optionally, if authorization tokens are available, they may be also forwarded to the LPA, so that the LPA may check if DP node (e.g., SM-DP+) 200 is authorized for the profile operations.

Steps 21 and 22: After mutual authentication, terminal 300 contacts the DP node (e.g., SM-DP+) 200 and requests the event(s) that may be available.

Step 24: DP node (e.g., SM-DP+) 200 determines the profile operation to which the event relates (e.g. enabling/disabling profile, profile download, etc.).

Steps 26 and 27: DP node (e.g., SM-DP+) 200 sends information about the profile operation (e.g. enable, disable . . . ) and EID to which it relates, as well as metadata if available (e.g. time window during the profile operation has to be performed). The information is forwarded to the eUICC.

Step 28: The terminal's 300 eUICC performs the required profile operation.

Step 29a: The eUICC notifies the LPA that the profile operation has been performed.

Step 29b: The LPA notifies DP node (e.g., SM-DP+) 200 that the profile operation has been performed.

Step 30: DP node (e.g., SM-DP+) 200 confirms receipt.

In one embodiment, DS 100 may send, in step 20, the indication of the profile operation to be performed, provided that DS 100 received that indication from DP node 200 and that the event record registered at DS 100 included that indication. In that embodiment, DS 100 need not transmit any DP node identifier to terminal 300, steps 23 to 26 may be skipped, and terminal 300 may directly proceed to perform the indicated profile operation (step 28) without contacting DP node 200.

Figure 7:
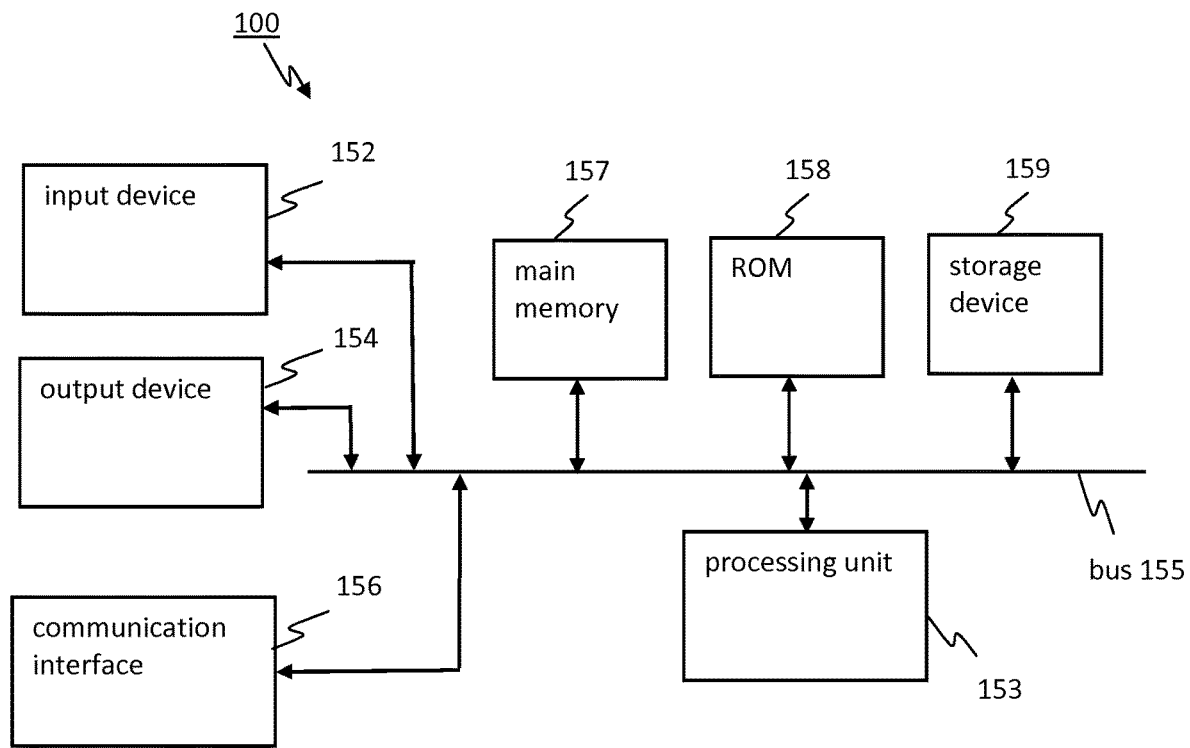
FIG. 7 is a schematic diagram of an exemplary implementation of a network node according to one embodiment of the invention.

FIG. 7 is a schematic diagram of an exemplary implementation of a discovery server (DS) 100 that may be used in embodiments of the invention. As mentioned later, DP node 200 (e.g. as schematically illustrated by FIG. 9) and terminal 300 (e.g. as schematically illustrated by FIG. 10) may be implemented using similar elements as those schematically illustrated by FIG. 7.

As illustrated by FIG. 7, DS 100 may include a bus 155, a processing unit 153, a main memory 157, a ROM 158, a storage device 159, an input device 152, an output device 154, and a communication interface 156. Bus 155 may include a path that permits communication among the components of discovery server 100.

Processing unit 153 may include a processor, a microprocessor, or processing logic that may interpret and execute instructions. Main memory 157 may include a RAM or another type of dynamic storage device that may store information and instructions for execution by processing unit 153. ROM 158 may include a ROM device or another type of static storage device that may store static information and instructions for use by processing unit 153. Storage device 159 may include a magnetic and/or optical recording medium and its corresponding drive.

Input device 152 may include a mechanism that permits a user to input information to discovery server 100, such as a keypad, a keyboard, a mouse, a pen, voice recognition and/or biometric mechanisms, etc. Output device 154 may include a mechanism that outputs information to the user, including a display, a printer, a speaker, etc. Communication interface 156 may include any transceiver-like mechanism, or receiver and transmitter, that enables discovery server 100 to communicate with other devices and/or systems (such as with a data preparation node 200, a terminal 300, etc.). For example, communication interface 156 may include mechanisms for communicating with another device or system via a telecommunication network.

DS 100 may perform certain operations or processes described herein. These operations may be performed in response to processing unit 153 executing software instructions contained in a computer-readable medium, such as main memory 157, ROM 158, and/or storage device 159. A computer-readable medium may be defined as a physical or a logical memory device. For example, a logical memory device may include memory space within a single physical memory device or distributed across multiple physical memory devices. Each of main memory 157, ROM 158 and storage device 159 may include computer-readable media. The magnetic and/or optical recording media (e.g., readable CDs or DVDs) of storage device 159 may also include computer-readable media. The software instructions may be read into main memory 157 from another computer-readable medium, such as storage device 159, or from another device via communication interface 156.

The software instructions contained in main memory 159 may cause processing unit 153 to perform operations or processes described herein, such as communicating with a DP node 200 or a terminal 300. Alternatively, hardwired circuitry may be used in place of or in combination with software instructions to implement processes and/or operations described herein. Thus, implementations described herein are not limited to any specific combination of hardware and software.

Figure 8A:
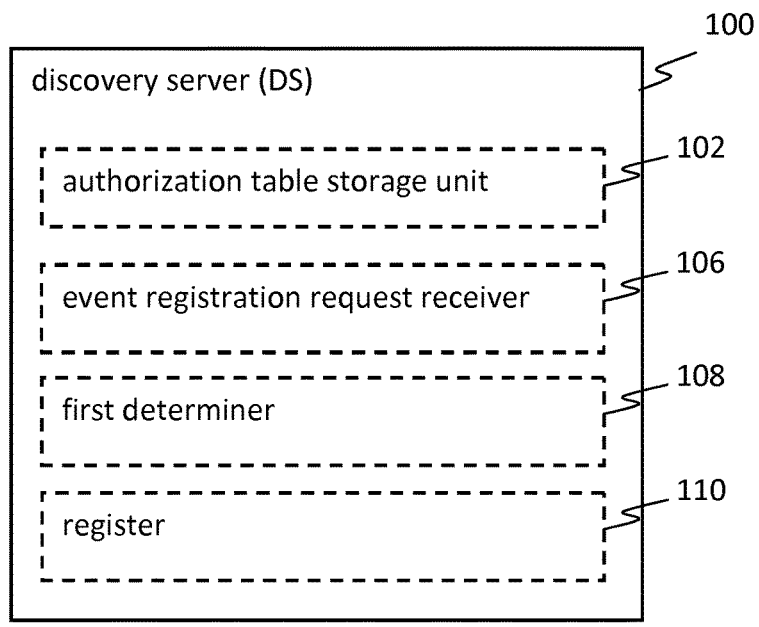
FIGS. 8a and 8b schematically illustrate network nodes, each referred to here as "discovery server" (DS), in some embodiments of the invention.

FIG. 8a schematically illustrates a network node in one embodiment of the invention, wherein the network node acts as a discovery server (DS) 100 for participating in provisioning and/or controlling operator profiles in terminals 300, wherein each terminal 300 comprises, as explained above, an integrated circuit card 301 identified by an integrated circuit card identifier. The network node 100 of FIG. 8a may for example be implemented using similar elements as those illustrated in FIG. 7, wherein communication interface 156 may be configured to communicate with other network nodes, and wherein processing unit 153 may execute computer instructions stored in e.g. main memory unit 157 so that these instructions cause DS 100 to behave according to any of the described embodiments.

According to the embodiment illustrated by FIG. 8a, DS 100 comprises a storage unit 102 here referred to as "authorization table storage unit", a first receiver 106 here referred to as "event registration request receiver", a first determiner 108, and a register 110.

Authorization table storage unit 102 is configured for storing a plurality of associations, here collectively referred to as "authorization table", wherein each association comprises: (i) an integrated circuit card identifier; (ii) a SPID for identifying a service provider 400 in charge of a terminal 300 comprising an integrated circuit card 301 identified by the integrated circuit card identifier; and, (iii) for each of at least one operator 500 authorized to handle profiles of the integrated circuit card 301, an operator identifier.

Event registration request receiver 106 is configured for receiving, from a DP node 200, a request, here referred to as "event registration request", which comprises: (a) an integrated circuit card identifier; (b) a service provider identifier; (c) an operator identifier; and (d) a DP node identifier for identifying the DP node 200.

First determiner 108 is configured for determining that the received integrated circuit card identifier, SPID, and operator identifier are associated with one another in the authorization table.

Register 110 is configured for registering an event record comprising the received integrated circuit card identifier, the received SPID, and the received DP node identifier.

In one embodiment, the event registration request, which the event registration request receiver 106 is configured to receive, further comprises an event identifier for identifying the event to be registered; and the event record that the register 110 is configured to register further comprises the received event identifier.

Figure 8B:
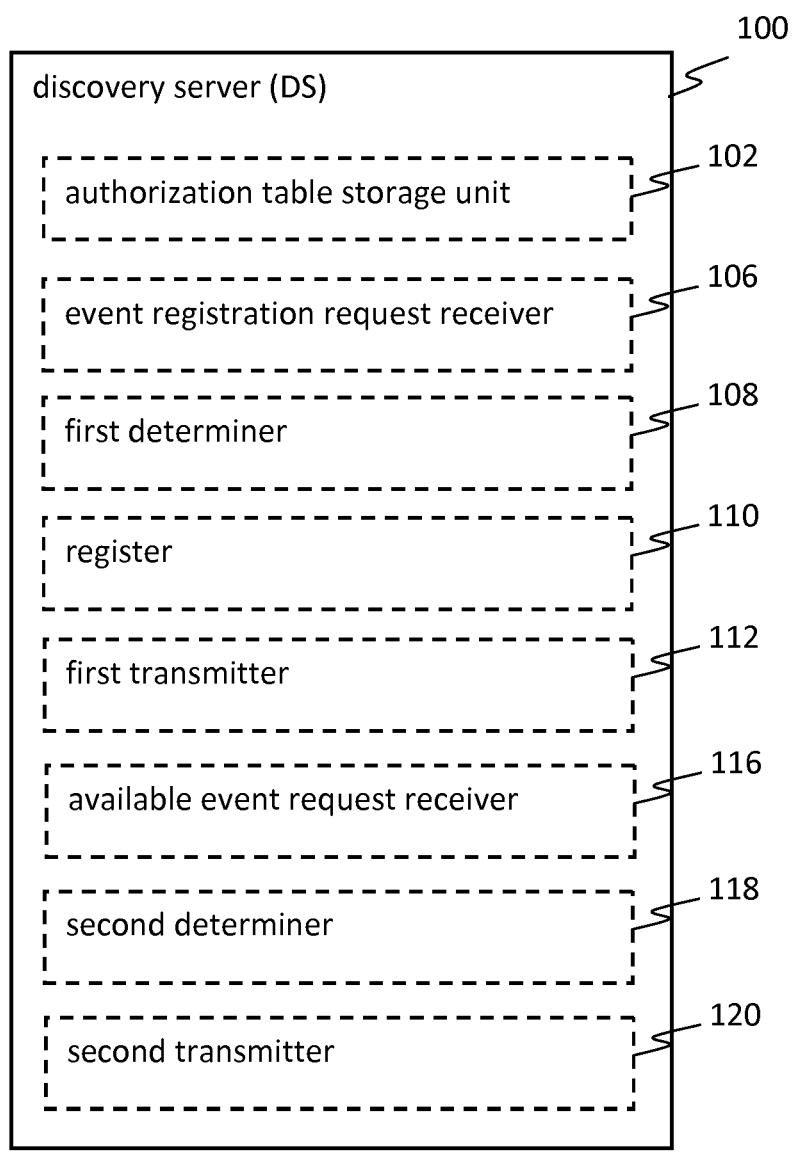

FIG. 8b schematically illustrates a network node acting as DS 100 in one embodiment of the invention, comprising an authorization table storage unit 102, an event registration request receiver 106, a first determiner 108, and a register 110, as described above with reference to FIG. 8a, and, in addition, an optional first transmitter 112, an optional second receiver 116 here referred to as "available event request receiver", an optional second determiner 118, and an optional second transmitter 120.

In one embodiment, register 110 is further configured for assigning an event identifier for identifying the event record; and DS 100 further comprises the above-referred first transmitter 112, which is configured for sending, to the DP node 200, the event identifier.

In one embodiment, DS 100 further comprises: the above-referred second receiver 116, the above-referred second determiner 118, and the above-referred second transmitter 120. Available event request receiver 116 is configured for receiving, from terminal 300, a request for an available event, the request comprising the integrated circuit card identifier and the SPID. Second determiner 118 is configured for determining that the event record comprises the received integrated circuit card identifier and SPID. Second transmitter 120 is configured for sending, to terminal 300, the DP node identifier comprised in the event record.

In one embodiment, second transmitter 120 is further configured for sending, to terminal 300, the event identifier.

In one embodiment, at least one of the associations in the authorization table, which authorization table storage unit 102 is configured to store, further comprises, for at least one operator identifier, indication of at least one authorized profile operation; the event registration request, which event registration request receiver 106 is configured to receive, further comprises an indication of a profile operation to be performed; and first determiner 108 is further configured for determining that the profile operation for which an indication has been received is indicated as authorized in the authorization table.

In one embodiment, the at least one authorized profile operation comprises at least one of: a profile download, a profile enable, a profile disable, and a profile delete.

Figure 9A:
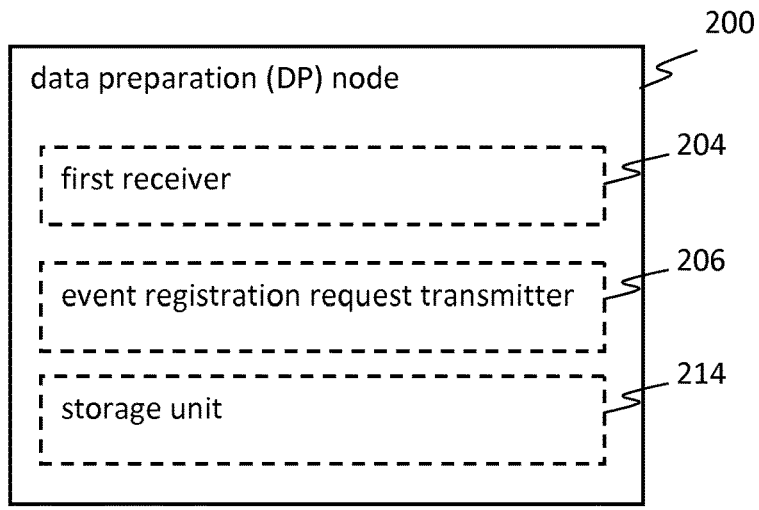
FIGS. 9a and 9b schematically illustrate network nodes, each referred to here as "data preparation node" (DP node), in some embodiments of the invention.
Figure 10:
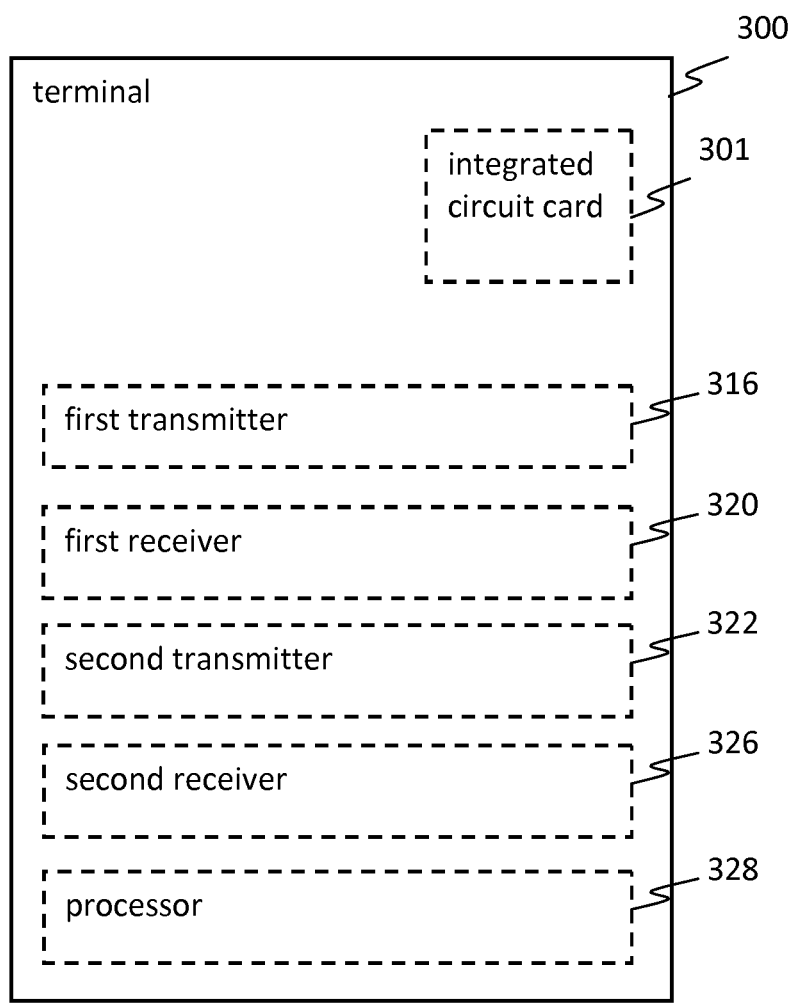
FIG. 10 schematically illustrates a terminal in one embodiment of the invention.

FIG. 9a schematically illustrates a network node in one embodiment of the invention, wherein the network node acts as a DP node 200 for participating in provisioning and/or controlling operator profiles in terminals 300, each terminal 300 comprising, as mentioned above, an integrated circuit card 301 identified by an integrated circuit card identifier. The DP node 200 of FIG. 9a may for example be implemented using similar elements as those illustrated in FIG. 7, wherein communication interface 156 may be configured to communicate with other network nodes, and wherein processing unit 153 may execute computer instructions stored in e.g. main memory unit 157 so that these instructions cause data preparation node 200 to behave according to any of the described embodiments.

According to the embodiment illustrated by FIG. 9a, DP node 200 comprises a first receiver 204, a first transmitter 206 here referred to as "event registration request transmitter", and a storage unit 214.

First receiver 204 is configured for receiving a request to perform a profile operation, the request comprising: (I) an integrated circuit card identifier; (II) a service provider identifier (SPID); (III) an operator identifier; and (IV) information relating to the profile operation to be performed.

Event registration request transmitter 206 is configured for sending, to DS 100, an event registration request comprising: (i) the received integrated circuit card identifier; (ii) the received SPID; (iii) the received operator identifier; and (iv) a DP node identifier for identifying the DP node 200.

Storage unit 214 is configured for associating the integrated circuit card identifier, the SPID, and an indication of the profile operation to be performed, with one another.

In one embodiment, the event registration request, which the event registration request transmitter 206 is configured to send, further comprises an event identifier for identifying the event to be registered; and storage unit 214 is further configured for associating the event identifier with the integrated circuit card identifier, the SPID, and the indication of the profile operation.

Figure 9B:
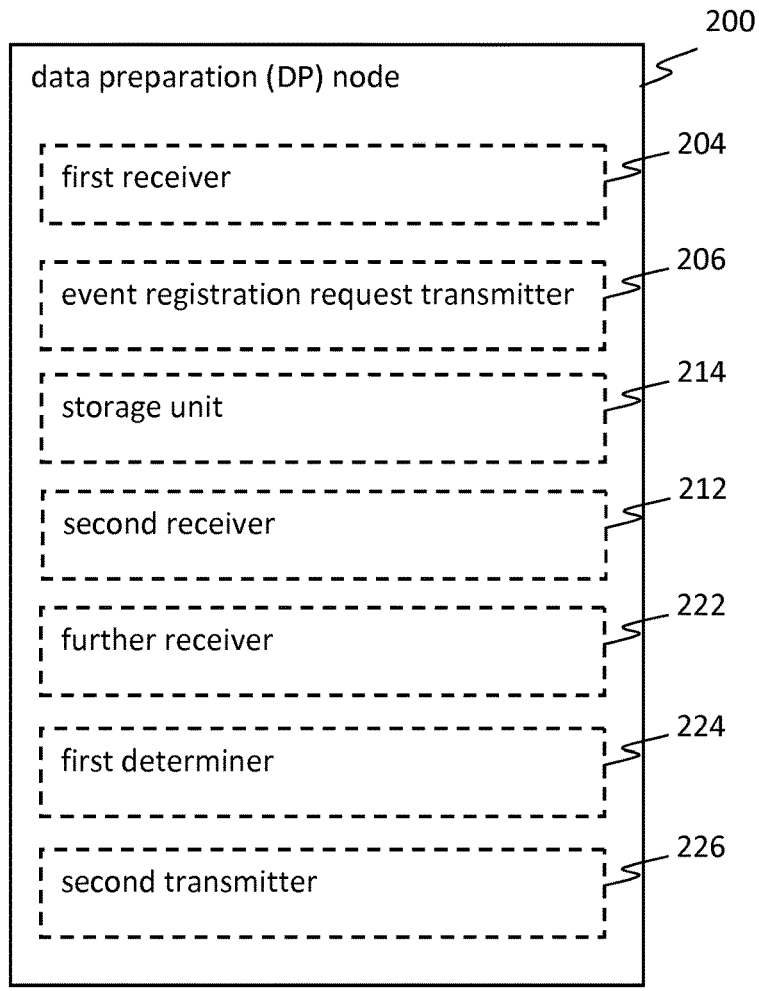

FIG. 9b schematically illustrates a DP node 200 in one embodiment of the invention, comprising a first receiver 204, an event registration request transmitter 206, and a storage unit 214, as described above with reference to FIG. 9a, and, in addition, an optional second receiver 212, an optional further receiver 222, an optional first determiner 224, and an optional second transmitter 226.

In one embodiment, DP node 200 further comprises the above-referred second receiver 212 configured for receiving, from DS 100, an event identifier; wherein storage unit 214 is further configured for associating the received event identifier with the integrated circuit card identifier, the SPID, and the indication of the profile operation.

In one embodiment, DP node 200 further comprises: the above-referred further receiver 222 configured for receiving, from a terminal 300, a request for a profile operation comprising the event identifier; the above-referred first determiner 224 configured for determining that the event identifier is associated with the indication of the profile operation to be performed; and the above-referred second transmitter 226 configured for sending, to terminal 300, the indication of the profile operation to be performed determined to be associated with the event identifier.

In one embodiment, DP node 200 further comprises the above-referred further receiver 222 configured for receiving, from a terminal 300, a request for a profile operation comprising the integrated circuit card identifier and the SPID; the above-referred first determiner 224 configured for determining that the integrated circuit card identifier and the SPID are associated with the indication of the profile operation to be performed; and the above-referred second transmitter 226 configured for sending, to the terminal 300, the indication of the profile operation to be performed determined to be associated with the integrated circuit card identifier and the SPID.

FIG. 10 schematically illustrates a terminal 300 in one embodiment of the invention. Terminal 300 illustrated on FIG. 10 may for example be implemented as illustrated on FIG. 7, although machine-to-machine (M2M) devices may comprise fewer elements than illustrated in FIG. 7 (e.g. since there might be no end user behind the M2M device, no human-to-machine input device/interface may be necessary). Processing unit 153 of FIG. 7 may execute computer instructions stored in e.g. main memory unit 157 so that these instructions cause terminal 300 to behave according to any of the described embodiments.

Terminal 300 comprises, as mentioned above, an integrated circuit card 301 identified by an integrated circuit card identifier. Terminal 300 further comprises a first transmitter 316, a first receiver 320, a second transmitter 322, a second receiver 326, and a processor 328 (which may be the same as processing unit 153 of FIG. 7. First transmitter 316 is configured for sending, to DS 100, a request for an available event, the request comprising the integrated circuit card identifier for identifying the integrated circuit card 301 comprised in terminal 300, and a SPID for identifying a service provider 400 in charge of terminal 300. First receiver 320 is configured for receiving, from DS 100, a DP node identifier for identifying a DP node 200. Second transmitter 322 is configured for sending, to DP node 200 identified by the DP node identifier, a request for a profile operation. Second receiver 326 is configured for receiving, from DP node 200, an indication of a profile operation to be performed. In an embodiment, first and second transmitters may be implemented by a unique transmitter, and first and second receivers may be implemented by a unique receiver. Finally, processor 328 is configured for performing the indicated profile operation.

In one embodiment, the request for a profile operation comprises the integrated circuit card identifier and the SPID.

In one embodiment, first receiver 320 is further configured for receiving, from DS 100, an event identifier for identifying an event record; and the request for a profile operation, which second transmitter 322 is configured to send, comprises the event identifier.

Where the terms "authorization table storage unit", "event registration request receiver", "first determiner", "register", "first transmitter", "storage unit", "processor" etc. are used herewith, no restriction is made regarding how distributed these elements may be and regarding how gathered elements may be. That is, the constituent elements of a unit, function or network node may be distributed in different software or hardware components or devices for bringing about the intended function. A plurality of distinct elements may also be gathered for providing the intended functionalities.

Any one of the above-referred units of a network node may be implemented in hardware, software, field-programmable gate array (FPGA), application-specific integrated circuit (ASICs), firmware or the like.

In further embodiments of the invention, any one of the above-mentioned authorization table storage unit, event registration request receiver, first determiner, register, first transmitter, storage unit, processor, etc. is replaced by authorization table storage means, event registration request receiving means, first determining means, registering means, first transmitting means, storage means, processing means, etc. or authorization table storage module, event registration request receiving module, first determining module, registering module, first transmitting module, storage module, processing module, etc. respectively, for performing the functions of the authorization table storage unit, event registration request receiver, first determiner, register, first transmitter, storage unit, processor, etc.

In further embodiments of the invention, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

Abbreviations:
DP data preparation
DS discovery server
EID eUICC identifier
eSIM embedded SIM
eUICC embedded universal integrated-circuit card
GSM Global System for Mobile communications
GSMA GSM Association
IoT Internet of things
IP Internet Protocol
ISD-P Issuer Security Domain-Profile
LDS Local Discovery Service
LPA Local Profile Assistant
LPD Local Profile Download
LUI Local User Interface
M2M machine-to machine
MNO mobile network operator
MNOID MNO identifier
OEM original equipment manufacturer
OTA over-the-air
RAM Random-access memory
ROM Read-only memory
RSP remote SIM provisioning
SIM subscriber identity module
SM-DP+ Subscription Manager Data Preparation+
SM-DS Subscription Manager Discovery Service
SP service provider
SPID service provider identifier
UE user equipment

The invention claimed is:

1. A method, carried out by a discovery server for participating in at least one of provisioning and controlling operator profiles in terminals, each terminal comprising an integrated circuit card identified by an integrated circuit card identifier, the discovery server being configurable with an authorization table of associations between integrated circuit card identifiers, service provider identifiers and operator identifiers, the method comprising:

receiving, from a data preparation node, an event registration request comprising:
- an integrated circuit card identifier;
- a service provider identifier for identifying a service provider in charge of a terminal comprising an integrated circuit card identified by the integrated circuit card identifier;
- for each of at least one operator authorized to handle profiles of the integrated circuit card, an operator identifier; and
- a data preparation node identifier for identifying the data preparation node;

receiving, with the event registration request, information to enable configuration of the discovery server with the authorization table;

determining that the received integrated circuit card identifier, service provider identifier, and operator identifier are associated with one another in the authorization table; and registering an event record comprising the received integrated circuit card identifier, service provider identifier, and data preparation node identifier.

2. The method of claim 1, wherein:
the event registration request further comprises an event identifier for identifying the event to be registered; and
the event record further comprises the received event identifier.

3. The method of claim 1, wherein:
registering the event record further comprises: assigning an event identifier for identifying the event record; and
the method further comprises: sending, to the data preparation node, the event identifier.

4. The method according to claim 1, further comprising:
receiving, from a terminal, a request for an available event, the request comprising the integrated circuit card identifier and the service provider identifier;
determining that the event record includes the received integrated circuit card identifier and service provider identifier; and
sending, to the terminal, the data preparation node identifier included in the event record.

5. The method of claim 2, further comprising: sending, to the terminal, the event identifier.

6. The method according to claim 1, wherein:
at least one of the associations in the authorization table further includes, for at least one operator identifier, indication of at least one authorized profile operation;
the event registration request further includes an indication of a profile operation to be performed; and
determining that the received integrated circuit card identifier, service provider identifier, and operator identifier are associated with one another in the authorization table, further comprises: determining that the profile operation for which an indication has been received is indicated as authorized in the authorization table.

7. The method of claim 6, wherein the at least one authorized profile operation includes at least one of: a profile download, a profile enable, a profile disable, and a profile delete.

8. The method according to claim 2, further comprising:
receiving, from a terminal, a request for an available event, the request including the integrated circuit card identifier and the service provider identifier;
determining that the event record includes the received integrated circuit card identifier and service provider identifier; and
sending, to the terminal, the data preparation node identifier included in the event record.

9. The method according to claim 3, further comprising:
receiving, from a terminal, a request for an available event, the request including the integrated circuit card identifier and the service provider identifier;
determining that the event record includes the received integrated circuit card identifier and service provider identifier; and
sending, to the terminal, the data preparation node identifier included in the event record.

10. The method according to claim 2, wherein:
at least one of the associations in the authorization table further includes, for at least one operator identifier, an indication of at least one authorized profile operation;
the event registration request further includes an indication of a profile operation to be performed; and
determining that the received integrated circuit card identifier, service provider identifier, and operator identifier are associated with one another in the authorization table, further comprises: determining that the profile operation for which an indication has been received is indicated as authorized in the authorization table.

* * * * *